United States Patent
Schwartz et al.

(10) Patent No.: US 6,372,287 B1
(45) Date of Patent: Apr. 16, 2002

(54) USE OF AQUEOUS FILM-FORMING PREPARATIONS BASED ON COPOLYMERS OF METHACRYLIC ACID ALKYL ESTERS FOR COATING MINERAL SHAPED BODIES

(75) Inventors: Manfred Schwartz, Frankenthal; Bertold Bechert, Grünstadt; Harm Wiese, Heidelberg; Wolfgang Hümmer, Birkenheide; Bernd Reck, Grünstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,874

(22) PCT Filed: Mar. 8, 1999

(86) PCT No.: PCT/EP99/01484

§ 371 Date: Sep. 11, 2000

§ 102(e) Date: Sep. 11, 2000

(87) PCT Pub. No.: WO99/46219

PCT Pub. Date: Sep. 16, 1999

(30) Foreign Application Priority Data

Mar. 9, 1998 (DE) .......................... 198 10 050

(51) Int. Cl.$^7$ .............................. B05D 1/38; B05D 3/02
(52) U.S. Cl. ................. 427/136; 427/393.6; 427/407.1
(58) Field of Search .............................. 427/136, 393.6, 427/407.1

(56) References Cited

U.S. PATENT DOCUMENTS

| | | | |
|---|---|---|---|
| 3,027,294 A | * 3/1962 | Bettoli et al. | |
| 4,970,172 A | 11/1990 | Kundu | 436/130 |
| 4,999,218 A | 3/1991 | Rehmer et al. | 427/379 |
| 5,047,295 A | 9/1991 | Dotzauer et al. | 428/500 |
| 5,071,769 A | 12/1991 | Kundu et al. | 436/128 |
| 5,174,959 A | 12/1992 | Kundu et al. | 422/59 |
| 5,718,943 A | * 2/1998 | Hsu et al. | 427/136 |

FOREIGN PATENT DOCUMENTS

| | | |
|---|---|---|
| DE | 38 27 975 | 3/1990 |
| DE | 39 01 073 | 7/1990 |
| DE | 40 03 909 | 8/1991 |
| DE | 195 37 935 | 4/1996 |
| DE | 195 14 266 | 10/1996 |
| EP | 279 069 | 8/1988 |
| EP | 441 221 | 8/1991 |
| EP | 469295 A2 * | 2/1992 |
| JP | 06-228367 A2 * | 8/1994 |

* cited by examiner

*Primary Examiner*—Erma Cameron
(74) *Attorney, Agent, or Firm*—Oblon, Spivak, McClelland, Maier & Neustadt, P.C.

(57) ABSTRACT

The present invention provides for the use of aqueous film-forming formulations comprising at least one copolymer P as film-forming constituent which is present in disperse form in the formulation and is composed of ethylenically unsaturated monomers M, the monomers M comprising i. from 70 to 99.9% by weight of at least one ester of methacrylic acid with a $C_1$–$C_{10}$-alkanol and ii. from 0.1 to 30% by weight of at least one different monoethylenically unsaturated monomer and at least 50% by weight of the monomers M being other than methyl methacrylate and not more than 1% by weight of the monomers M having two or more ethylenically unsaturated double bonds, for coating mineral moldings.

The present invention additionally provides a method of coating the mineral moldings, and also the mineral moldings themselves.

9 Claims, No Drawings

USE OF AQUEOUS FILM-FORMING PREPARATIONS BASED ON COPOLYMERS OF METHACRYLIC ACID ALKYL ESTERS FOR COATING MINERAL SHAPED BODIES

Use of aqueous film-forming preparations based on copolymers of methacrylic acid alkyl esters for coating mineral shaped bodies The present invention relates to the use of film-forming aqueous formulations which comprise at least one copolymer P in disperse form for coating mineral moldings.

For the purposes of the invention mineral moldings here and below are shaped articles which comprise a mineral binder and mineral aggregates. The formulations comprising mineral binder and the aggregates can be shaped in the wet state and undergo stonelike solidification over time in the air or else under water, with or without exposure to elevated temperature, to form the desired mineral molding. Mineral binders are general knowledge. They are finely divided inorganic substances such as lime, gypsum, clay and/or cement. Mineral aggregates are generally granular or fibrous, natural or synthetic rock materials (gravel, sand, mineral fibers) with particle sizes or fiber lengths adapted conventionally to the respective end use. In addition, in special cases the mineral moldings also include metals or organic adjuvants. For the purpose of coloration, color pigments are frequently also used as adjuvants.

Examples of mineral moldings to be coated in accordance with the invention are concrete pipes, such as those for wastewater, concrete roofing (cf. e.g. DE-A 39 01 073) or edging stones, steps, floor slabs, pedestal slabs and fiber cement slabs, i.e. flat mineral moldings filled with inorganic or organic fibers, such as polyester fibers or nylon fibers, for example.

A disadvantage of mineral moldings is that under the influence of weathering (especially exposure to water) they lose their strength, since the cationic constituents, such as $Ca^{2+}$, are leached out over time. A further disadvantageous property of mineral moldings is the occurrence of efflorescence phenomena. These are probably attributable to the fact that the mineral binders contain cations with a valence of two or more, such as $Ca^{2+}$, in an alkaline environment. Reaction with the carbon dioxide from the air can therefore cause the formation, on the surface of the mineral moldings, of white spots of lime which are unsightly and relatively insoluble in water. The phenomenon of efflorescence may appear either during the hardening of freshly prepared mineral moldings or on exposure to weathering of mineral moldings which have already hardened.

In order to avoid these disadvantageous properties, the mineral moldings are often provided with a coating. For this purpose use is generally made of aqueous coating systems whose film-forming constituent comprises an aqueous polymer dispersion. Customary film-forming constituents include styrene-acrylate copolymers, vinyl acetate homo- and copolymers, pure acrylates and the like. Coating gives the mineral moldings a lustrous appearance which is desirable for numerous applications, especially in the case of concrete roof tiles.

DE-A-38 27 975 and DE-A-40 03 909 disclose coatings for concrete slabs that are based on aqueous polymer dispersions comprising at least one aromatic ketone as photosensitizer. The photosensitizer causes superficial crosslinking of the coating. Although this largely prevents the unwanted efflorescence, the coatings are unstable to long-term weathering. In addition, EP-A 279 069 discloses transparent coating materials which comprise highly crosslinked polymers based on alkyl methacrylates. Coatings of this kind lose their luster on weathering and become brittle over time.

The protection of mineral moldings against the above-described efflorescence has also been improved by coating compositions based on styrene-acrylate dispersions or all-acrylate dispersions of EP-A-469 295 and DE-A-195 14 266. For this purpose EP-A-469 295 recommends the use of a specific anionic emulsifier and DE-A-195 14 266 the use of polymers comprising, in copolymerized form, specific monomers having sulfonate groups.

The prior art coatings all have the disadvantages that they lose their luster on prolonged weathering and that their mechanical strength and elasticity decline.

It is an object of the present invention to provide coatings for mineral moldings which are suitable for long-term outdoor use and which do not lose their luster or elasticity even after a long period. In addition, the coatings should effectively prevent efflorescence and should adhere well to the mineral substrates.

We have found that this object is achieved by aqueous formulations whose film-forming constituent comprises substantially or fully uncrosslinked copolymers P that are composed essentially of alkyl esters of methacrylic acid, the majority of the monomers being other than methyl methacrylate, and which lead to coatings having high long-term stability in respect of their luster. In addition, the coatings have good adhesion to mineral substrates and afford good protection against efflorescence.

The present invention therefore provides for the use of aqueous film-forming formulations comprising at least one copolymer P as film-forming constituent which is present in disperse form in the formulation and is composed of ethylenically unsaturated monomers M, the monomers M comprising i. from 70 to 99.9% by weight of at least one ester of methacrylic acid with a $C_1$–$C_{10}$-alkanol and ii. from 0.1 to 30% by weight of at least one different monoethylenically unsaturated monomer and at least 50% by weight of the monomers M being other than methyl methacrylate and not more than 1% by weight of the monomers M having two or more ethylenically unsaturated double bonds, for coating mineral moldings.

Examples of suitable esters of methacrylic acid with $C_1$–$C_{10}$-alkanols are methyl, ethyl, n-propyl, isopropyl, n-butyl, 2-butyl, isobutyl, tert-butyl, 1-methylbutyl, 2-methylbutyl, 3-methylbutyl, 1,1-dimethylbutyl, 2,2-dimethylbutyl, n-pentyl, 1-methylpentyl, 2-methylpentyl, 2-ethylpentyl, n-hexyl, 1-methylhexyl, 2-methylhexyl, 2-ethylhexyl, n-heptyl, 1-methylheptyl, 2-methylheptyl, 2-propylheptyl, n-octyl, 1-methyloctyl, 2-methyloctyl and n-decyl methacrylate. Preference is given to the esters of methacrylic acid with n-alkanols having 2 to 6 carbon atoms, i.e. ethyl, n-propyl, n-butyl, n-pentyl and n-hexyl methacrylate. Of these, n-butyl methacrylate is particularly preferred.

In accordance with the invention, from 70.0 to 99.9% by weight, preferably from 90.0 to 99.8% by weight, in particular from 95.0 to 99.5% by weight and, with very particular preference, from 97.0 to 99.0% by weight of the monomers M in the copolymers P are selected from the abovementioned esters of methacrylic acid. At the same time, preferably at least 80% by weight, in particular at least 90% by weight and, with very particular preference, all of the monomers M are other than methyl methacrylate.

The advantages of the coatings of the invention are manifested in particular when the copolymers P comprise n-butyl methacrylate as sole ester of methacrylic acid in copolymerized form.

In addition to the esters of methacrylic acid the copolymers P comprise from 0.1 to 30% by weight, in particular from 0.2 to 10% by weight, with very particular preference from 0.5 to 5% by weight and, specifically, from 1.0 to 3.0% by weight of copolymerized monomers which are different from but copolymerizable with the alkyl methacrylates.

The monomers different from the alkyl methacrylates include firstly those monomers which are normally employed as principal monomers in coating compositions based on aqueous polymer dispersions. Examples of such monomers, referred to below as monomers MH, are vinylaromatic monomers, such as styrene, α-methylstyrene, o-chlorostyrene or vinyltoluenes, vinyl esters of aliphatic $C_1$–$C_{18}$-monocarboxylic acids, such as vinyl acetate, propionate, butyrate, valerate, hexanoate, 2-ethylhexanoate, decanoate, pivalate, laurate and stearate and commercial monomers VEOVA® 5-11 (VEOVA® X is a trade name of Shell and stands for vinyl esters of a-branched aliphatic carboxylic acids having X carbon atoms, which are also known as Versatic® X acids) and also the esters of ethylenically unsaturated $C_3$–$C_8$-mono- or dicarboxylic acids, other than methacrylic acid, with $C_1$–$C_{18}$-, preferably $C_1$–$C_{12}$- and, in particular, $C_1$–$C_8$-alkanols or $C_5$–$C_8$-cycloalkanols, examples being the esters of acrylic acid, such as methyl, ethyl, n-propyl, isopropyl, n-butyl, isobutyl, 1-hexyl, tert-butyl and 2-ethylhexyl acrylate, and also the esters of fumaric and maleic acid, such as dimethyl fumarate, dimethyl maleate and di-n-butyl maleate. Preferably, the copolymers P contain not more than 20% by weight of, in particular not more than 10% by weight of and, with very particular preference, no monomers MH in copolymerized form.

The monomers M frequently comprise monomers of increased solubility in water, referred to below as monomers MW. For the purposes of the invention increased solubility in water is a solubility of at least 60 g/l at 25° C. and 1 bar. Normally, the copolymers P comprise from 0.1 to 10% by weight, in particular from 0.2 to 5.0% by weight and, with very particular preference, from 0.5 to 4.0% by weight of monomers MW in copolymerized form.

Monomers MW comprise, firstly, monoethylenically unsaturated monomers having an acidic functionality. These include monoethylenically unsaturated $C_3$–$C_8$-monocarboxylic acids, such as acrylic, methacrylic, crotonic, vinylacetic, acrylamidoglycolic and methacrylamidoglycolic acid, monoethylenically unsaturated $C_4$–$C_8$-dicarboxylic acids, such as maleic, fumaric, itaconic and citraconic acid, their monoesters with $C_1$–$C_{12}$-alkanols, such as monomethyl maleate and mono-n-butyl maleate, ethylenically unsaturated sulfonic acids, such as vinyl-, 2-acrylamido-2-methylpropane-, 2-acryloyloxyethane-, 2-methacryloyloxy-ethane-, 3-acryloyloxypropane-, 3-methacryloyloxypropane- and vinylbenzene-sulfonic acid and salts thereof, preferably their alkali metal salts or their ammonium salts and in particular their sodium salts. The monomers MW also include neutral monomers, examples being the amides of ethylenically unsaturated monocarboxylic acids, such as acrylamide and methacrylamide, the hydroxyalkyl esters of the abovementioned ethylenically unsaturated mono- and dicarboxylic acids, examples being hydroxyethyl, hydroxypropyl and 4-hydroxybutyl acrylate, the corresponding methacrylates, and water-soluble N-vinyllactams, an example being N-vinylpyrrolidone. Also suitable are nitriles of α,β-monoethylenically unsaturated $C_3$–$C_8$-carboxylic acids, such as acrylonitrile or methacrylonitrile, as monomers MW. Preferred monomers MW are acrylic, methacrylic, itaconic and citraconic acids, and acrylamide and methacrylamide.

A preferred embodiment of the present invention relates to the use of copolymers P in which the monomers M include from 0.1 to 2.5% by weight, in particular from 0.5 to 2.0% by weight of a monoethylenically unsaturated carboxylic acid, especially acrylic, methacrylic or itaconic acid, and from 0.1 to 2.5% by weight, in particular from 0.5 to 2.0% by weight of one of the abovementioned amides of monoethylenically unsaturated carboxylic acids, especially acrylamide or methacrylamide, as monomers MW.

The monomers M frequently include silicon-containing monomers, preferably ethylenically unsaturated monomers containing siloxane groups, as are specified, for example, in DE-A 195 37 935. In this respect, the content of that document is incorporated by reference. Examples of monomers containing siloxane groups are the vinyltrialkoxysilanes, e.g. vinyltrimethoxysilane, the alkylvinyldialkoxysilanes and the (meth)acryloyloxyalkyltrialkoxysilanes, examples being (meth)acryloyloxyethyltrimethoxy-silane and (meth)acryloyloxypropyltrimethoxysilane. The silicon-containing monomers lead to improved adhesion of the coatings to mineral substrates and can be used if desired in amounts of from 0.05 to 2.0% by weight, preferably from 0.1 to 1.0% by weight, based on the monomers M.

In accordance with the invention the copolymers P are substantially uncrosslinked. Accordingly, the constituent monomers of the copolymer P include not more than 1% by weight, preferably less than 0.5% by weight, in particular less than 0.1% by weight, and, with very particular preference, no monomers having two or more ethylenically unsaturated double bonds (monomers MV). In addition, it is of advantage in accordance with the invention if the monomers M include not more than 1% by weight, preferably less than 0.5% by weight, in particular less than 0.1% by weight and, with very particular preference, no bifunctional monomers (monomers MV'). The monomers MV' are ethylenically unsaturated compounds which in addition to the ethylenically unsaturated double bond have at least one further reactive group which is capable of reacting to form a bond with a functional group in the polymer or with a bi- or polyfunctional compound, examples of such groups being epoxy, N-alkylol or carbonyl. With very particular preference, the monomers M do not include any monomers MV'.

The copolymer P normally has a glass transition temperature in the range from −25 to +80° C. and, preferably, in the range from −10 to +50° C. In this context it should be noted that a high-quality coating is only obtained when the aqueous formulation of the film-forming copolymer P has a minimum film-forming temperature which is below the application temperature. The minimum film-forming temperature depends in turn on the glass transition temperature $T_G$ of the copolymer P (see Ullmann's Encyclopedia of Industrial Chemistry, 5th Ed., Vol. A 21, 1992, p. 169). Fundamentally, the minimum film-forming temperature can be influenced by adding sparingly volatile compounds known as external plasticizers, such as esters of phthalic acid, and/or highly volatile, low-boiling organic solvents as film-forming auxiliaries to the aqueous formulation.

It has proven advantageous to tailor the formulations that are employed in accordance with the invention to their specific end applications by choosing an appropriate glass transition temperature for the copolymer P. For instance, a glass transition temperature $T_G$ for the copolymers P of above −10° C. and, in particular, above +10° C. has been found advantageous for the coating of concrete slabs. In this embodiment of the invention it is preferred not to exceed a $T_G$ of +50° C. In the case of fiber cement slabs, which both can be coated at elevated temperature and are intended to have a high blocking resistance, on the other hand, a glass transition temperature of above +20° C. and, in particular, above +30° C. has been found advantageous. The glass transition temperature $T_G$ referred to here is the midpoint temperature determined in accordance with ASTM D 3418-82 by differential thermal analysis (DSC) (cf. Ullmann's Encyclopedia of Industrial Chemistry, 5th Edition, Volume A 21, VCH Weinheim 1992, p. 169 and also Zosel, Farbe und Lack 82 (1976), pp. 125–134, see also DIN 53765). The glass transition temperature can also be determined by measuring the modulus of elasticity in the creep test as a function of temperature.

It proves useful in this context to estimate the glass transition temperature $T_G$ of the copolymer P. According to Fox (T. G. Fox, Bull. Am. Phys. Soc. (Ser. II) 1, 123 [1956] and Ullmann's Enzyklopädie der technischen Chemie, Weinheim (1980), p. 17, 18) the glass transition temperature of copolymers with a low degree of crosslinking is given for high molecular masses in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions 1, 2, ..., n and $T_g^1, T_g^2, \ldots, T_g^n$ the glass transition temperatures, of the homo-polymers of the monomers 1, 2, ..., n, in kelvins. The latter are given, for example, in Ullmann's Encyclopedia of Industrial Chemistry, VCH, Weinheim, Vol. A 21 (1992) p. 169 or in J. Brandrup, E. H. Immergut, Polymer Handbook $3^{rd}$ Ed., J. Wiley, New York 1989.

The copolymers P that are present in the aqueous formulations employed in accordance with the invention can in principle be prepared by any conceivable method for the free-radical copolymerization of ethylenically unsaturated monomers: for example, by solution, precipitation, bulk, emulsion or suspension polymerization. The free-radical aqueous emulsion polymerization of the abovementioned monomers is preferred, in the presence of at least one free-radical polymerization initiator and, if desired, of one or more surface-active substances, since in this case the copolymers P are obtained in the form of an aqueous dispersion. It is also possible, however, to operate by any of the other polymerization methods. It may then be necessary, if appropriate, to carry out subsequent conversion of the copolymers P to an aqueous dispersion (secondary dispersion).

In accordance with the invention, the film-forming aqueous formulations comprise the copolymer P in the form of an aqueous dispersion. The particles of copolymer in this dispersion can have average sizes in the range from 50 to 1000 nm. Methods of adjusting the polymer particle size are known, for example, from EP-A-126 699, EP-A-567 881, EP-A-567 819, DE-A-31 47 008 and DE-A-42 13 967.

Suitable free-radical polymerization initiators are all those that are able to trigger a free-radical aqueous emulsion polymerization; they may be peroxides, such as alkali metal peroxodisulfates or hydrogen peroxide, or azo compounds. Preference is given to redox initiator systems, which are composed of at least one organic reducing agent and at least one peroxide and/or hydroperoxide, e.g. tert-butyl hydroperoxide, with a sulfur compound, e.g. the sodium salt of hydroxymethane-sulfinic acid, sodium sulfite, sodium disulfite, sodium thio-sulfate or acetone bisulfite, or hydrogen peroxide with ascorbic acid. It is also possible for this purpose to use redox initiator systems containing a small amount of a metal compound which is soluble in the polymerization medium and whose metallic component is able to exist in two or more valence states, an example being iron(II) sulfate. Likewise preferred initiators are alkali metal peroxodisulfates, such as sodium peroxodisulfate, or ammonium peroxodisulfate. The amount of free-radical initiator systems employed, based on the overall amount of monomers to be polymerized, is preferably from 0.05 to 2% by weight, more preferably from 0.1 to 1% by weight.

Surface-active compounds suitable for conducting the emulsion polymerization are the emulsifiers and protective colloids that are normally employed for such purposes. The surface-active substances are usually employed in amounts of up to 10% by weight, preferably from 0.5 to 5% by weight and, in particular, from 1 to 4% by weight, based on the monomers to be polymerized.

Examples of suitable protective colloids are polyvinyl alcohols, starch derivatives and cellulose derivatives, or vinylpyrrolidone copolymers. A detailed description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, pp. 411–420. Suitable emulsifiers are given in the same reference on pages 192–208. Mixtures of emulsifiers and/or protective colloids can also be used.

As surface-active substances it is preferred to use exclusively emulsifiers, whose relative molecular weights, in contra-distinction to the protective colloids, are usually below 2000. They are preferably anionic or nonionic in nature. The anionic emulsifiers include alkali metal and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). The anionic surface-active substances also include compounds of the formula I

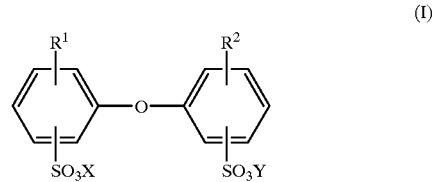

in which $R_1$ and $R^2$ are hydrogen or $C_4$–$C_{24}$-alkyl but are not both hydrogen, and X and Y can be alkali metal ions and/or ammonium ions. The compounds I are common knowledge from, for example, EP-A 469 295. Particularly advantageous compounds I are those in which X and Y are sodium, $R^1$ is a branched $C_{12}$ alkyl and $R^2$ is hydrogen or is the same as $R^1$. Use is frequently made of technical-grade mixtures with a proportion of from 50 to 90% by weight of the monoalkylated product, an example being Dowfax® 2A1 (trade mark of Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and polyethylene oxide/polypropylene oxide block copolymers.

Preference is given to anionic emulsifiers, especially emulsifiers of the formula I, or to combinations of at least two anionic or at least one anionic and one nonionic emulsifier.

The molecular weight of the polymers can be adjusted by adding small amounts, generally up to 2% by weight based on the monomers to be polymerized, of one or more molecular weight regulators, examples of these being organic thio compounds, allyl alcohols and aldehydes. Suitable regulators can also be used to introduce silicon-containing groups into the copolymer; this can be done using, for example, mercaptoalkyltrialkoxysilanes such as mercaptopropyltrimethoxysilane.

The emulsion polymerization can be conducted either continuously or batchwise, preferably by a semicontinuous procedure. In this case the monomers to be polymerized can be supplied continuously, including by a staged or gradient regime, to the polymerization batch. The monomers can be supplied either in the form of a monomer mixture or else as an aqueous monomer emulsion to the polymerization.

In addition to the seed-free preparation procedure, a defined polymer particle size can also be established by conducting the emulsion polymerization by the seed latex technique or in the presence of seed latex prepared in situ. Techniques of this kind are known and can be found in the prior art (see EP-B 40419 and Encyclopedia of Polymer Science and Technology, Vol. 5, John Wiley & Sons Inc., New York 1966, p. 847).

The pressure and temperature of polymerization are of minor importance. Polymerization is generally conducted at between room temperature and 120° C., preferably at from 40 to 110° C. and, with particular preference, at from 50 to 100° C.

Following the actual polymerization it may be necessary to substantially free the aqueous polymer dispersions of the invention from odoriferous substances, such as residual monomers and other volatile organic constituents. This can be done, conventionally, by physical means, through distillative removal (especially by steam distillation) or by stripping with an inert gas. A reduction in the amount of residual monomers can also be achieved chemically, by free-radical postpolymerization, especially under the action of redox initiator systems, as are set out, for example, in DE-A 44 35 423, DE-A 44 19 518 and DE-A 44 35 422. Postpolymerization is preferably conducted with a redox initiator system comprising at least one organic peroxide and an organic sulfite.

In this way it is possible to obtain polymer dispersions having polymer contents of up to 80% by weight, based on the overall weight of the dispersion. For preparing formulations employed in accordance with the invention it is preferred on practical grounds to employ dispersions having polymer contents in the range from 30 to 70% by weight, in particular from 40 to 65% by weight.

The formulations that are employed in accordance with the invention can in principle be in solvent-containing or solvent-free form as desired. In accordance with the invention, the dispersion medium used comprises water or mixtures of water with a water-miscible organic solvent, such as with a $C_1$–$C_4$-alkanol, such as methanol, ethanol, n- or isopropanol, n-, iso-,2- or tert-butanol, glycol, propylene glycol, butylene glycol, glycerol, diethylene glycol, triethylene glycol, tetrahydrofuran or the like.

The formulations of the invention preferably contain not more than 50% by weight, in particular not more than 20% by weight and, specifically, not more than 10% by weight of water-miscible solvents, based on the overall weight of the formulation. With very particular preference the formulations of the invention contain, apart from water, no organic solvents except for customary antifreeze agents and film-forming auxiliaries.

The solutions or dispersions of the copolymers P can in accordance with the invention be used as they are. However, the formulations generally include from 0.1 to 30% by weight of customary auxiliaries. In addition, the aqueous formulations, insofar as the copolymers P have been prepared by free-radical aqueous emulsion polymerization, also include the surface-active substances employed for this purpose, such as emulsifiers and/or protective colloids.

Examples of customary auxilaries are wetting agents, fungicides, defoamers, thickeners, antifreezes, leveling assistants, plasticizers and film-forming auxiliaries. Examples of suitable film-forming auxiliaries are ethylene glycol, propylene glycol, butylene glycol, hexylene glycol, diethylene glycol, dipropylene glycol, dibutylene glycol, their monoethers with Cl-$C_4$-alkanols, examples being diethylene glycol monoethyl and monobutyl ether, propylene glycol monophenyl and monopropyl and monobutyl ether, dipropylene glycol monopropyl and monobytyl ether, the ether acetates thereof, such as diethylene glycol monoethyl and monobutyl ether acetate, propylene glycol monopropyl and monobutyl ether acetate and dipropylene glycol n-butyl ether acetate, and also alkyl esters of aliphatic mono- and dicarboxylic acids, such as Texanol® from Eastman Kodak, or technical-grade mixtures thereof, such as Lusolvan FBH from BASF AG (di-n-butyl ester mixtures of succinic, glutaric and adipic acid). Suitable plasticizers are all those suitable for dispersions, examples being (oligo) propylene glycol alkyl phenyl ethers, as are obtainable commercially, for instance, as Plastilit® 3060 from BASF AG.

In addition, the aqueous formulations employed in accordance with the invention may also include inorganic fillers and/or pigments. Examples of typical pigments are titanium dioxide, preferably in the rutile form, barium sulfate, zinc oxide or lithopones (zinc sulfide+barium sulfate). For decorative purposes the formulations may often include colored pigments, examples being iron oxides, carbon black or graphite. Suitable fillers include alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, and silica, etc.

In a preferred embodiment of the present invention the aqueous formulations are employed in the form of a transparent coating material. In this case they generally include, based on their overall weight, from 10 to 60% by weight, preferably from 40 to 55% by weight of at least one copolymer P and from 0.1 to 30% by weight, preferably from 0.5 to 10% by weight, of customary auxiliaries, especially defoamers and/or film-forming auxiliaries.

In another embodiment of the present invention the aqueous formulations are employed in the form of pigmented and/or filled formulations. In this case the total content of copolymer P in the aqueous formulation is within the range from 10 to 60% by weight, preferably in the range from 20 to 40% by weight, the content of auxiliaries is within the range from 0.1 to 30% by weight and, preferably, in the range from 0.5 to 10% by weight, and the content of fillers and/or pigments is within the range from 10 to 60% by weight and, in particular, from 15 to 40% by weight. The amount of pigments and/or fillers is generally between 50 and 450 parts by weight, based on 100 parts by weight of copolymer P in the aqueous formulation. Pigment-containing formulations will also, preferably, include a dispersant and/or wetting agent in addition to the film-forming auxiliaries and the defoamers.

The present invention also provides a method of coating mineral moldings which comprises applying one of the aqueous formulations described herein to the mineral molding. In general the amount of aqueous formulation to be applied (calculated in its wet form) will be from 100 to 700 g/m². This corresponds to a dry add-on of from 50 to 400 g/m² and in particular, from 100 to 300 g/m². Application can take place in a manner known per se by spraying, troweling, knife coating, rolling or pouring. The drying which generally follows can be carried out either at room temperature or at an elevated temperature in the range, for example, of from 40 to 120° C.

In a customary embodiment of the process of the invention the mineral molding is provided with at least two coatings. For this purpose a first aqueous, film-forming formulation 1 is applied in a first step to the as yet untreated mineral molding, drying is carried out if desired, and then in a second step a further aqueous, film-forming formulation 2 is applied to the molding that has been provided with the first coating. Both the first step and second step can be repeated, thereby producing coatings with three or more layers.

It is essential to the invention that the film-forming constituent of the aqueous formulation 2 is the above-defined copolymer P. In contrast, the film-forming constituent of the first aqueous formulation 1 can be selected from the copolymers P and from different polymers P'. The latter are generally composed likewise of ethylenically unsaturated monomers and are present in dispersed form in the first aqueous formulation. In accordance with the invention the polymer P', like the copolymer P, will have a glass transition temperature in the range from −20 to +80° C. In a preferred embodiment of the present invention the film-forming constituent of the aqueous formulation 1 is a polymer P' which is different from the copolymer P.

Suitable polymers P' are all those polymers which are normally present in aqueous formulations for the coating of mineral moldings. Typical polymers P' and corresponding, aqueous, film-forming formulations suitable for the first coating of mineral moldings are described, for example, in EP-A 469 295 and in DE-A 195 14 266. The disclosure content of these documents is incorporated fully herein by reference.

Normally, the monomers M' making up the polymer P' are selected from the abovementioned monomers M, at least 30% by weight of the monomers M' being different from the abovementioned esters of methacrylic acid with $C_1$–$C_{10}$-alkanols, or the monomers M' comprising more than 50% by weight of methyl methacrylate.

In general, from 65 to 99.9% by weight, preferably from 90 to 99.8% by weight and, in particular, from 95 to 99.5% by weight of the monomers M' will be selected from vinylaromatic monomers, especially styrene and a-methylstyrene, from the abovementioned esters of acrylic acid with $C_1$–$C_{10}$-alkanols and from the vinyl esters of aliphatic monocarboxylic acids, it being possible for up to 70% by weight of the monomers M' to be selected from the esters of methacrylic acid with $C_1$–$C_{10}$-alkanols, and/or at least 50% by weight of methyl methacrylate. These monomers are referred to below as monomers MH'. In addition, the monomers M' generally include from 0.1 to 35% by weight, preferably from 0.2 to 90% by weight and, in particular, from 0.5 to 5% by weight of monomers different from the monomers MH'. These include, for example, the abovementioned monomers MW, MV, MV' and the silicon-containing monomers. With regard to the nature and amount of the monomers MW, MV, MV' and the organosilicon monomers, the comments made above in connection with the copolymer P apply. In particular, the monomers M' comprise little if any monomers MV or MV'.

Preferably, the monomers M' include at least two different monomers MH', referred to below as monomers MH1' and MH2'. Here, the monomers MH1' are preferably selected from methyl methacrylate, tert-butyl methacrylate, tert-butyl acrylate and vinylaromatic compounds. The monomers MH2' are preferably selected from the $C_1$–$C_{10}$-alkyl esters of acrylic acid and the esters of methacrylic acid with n-alkanols having 3 to 6 carbon atoms. Particularly preferred monomers MH1' are methyl methacrylate and styrene. Particularly preferred monomers MH2' are n-butyl acrylate, 2-ethylhexyl acrylate and n-butyl methacrylate. Typical monomer combinations MH1'/MH2' are:

styrene: n-butyl acrylate in a weight ratio of 35:65–80:20, styrene: 2-ethylhexyl acrylate in a weight ratio of 35:65–80:20, methyl methacrylate: n-butyl acrylate in a weight ratio of 40:60–80:20, methyl methacrylate: 2-ethylhexyl acrylate in a weight ratio of 35:65–80:20, and also ternary and quaternary monomer mixtures MH1'/MH2', in which some of the styrene is replaced by methyl methacrylate and/or n-butyl methacrylate, or some of the n-butyl acrylate by 2-ethylhexyl acrylate, e.g.:

methyl methacrylate:styrene:2-ethylhexyl acrylate in a weight ratio of 20:20:60, n-butyl methacrylate:styrene:2-ethylhexyl acrylate in a weight ratio of 35:10:55, methyl methacrylate:n-butyl methacrylate:n-butyl acrylate in a weight ratio of 30:35:35 styrene:n-butyl acrylate:2-ethylhexyl acrylate in a weight ratio of 50:25:25 and styrene:methyl methacrylate:n-butyl acrylate:2-ethylhexyl acrylate in a weight ratio of 20:20:30:30.

The polymers P' can be prepared by the preparation methods described for the copolymers P, preference being given for the polymers P' as well to preparation by free-radical aqueous emulsion polymerization.

Preferably, following their preparation, the aqueous dispersions both of the polymers P' and of the copolymers P are neutralized by adding a base, suitable examples being ammonia, sparingly volatile amines, alkali metal hydroxides or alkaline earth metal hydroxides or alkaline earth metal oxides. The pH of the dispersions following neutralization is preferably in the range from 6 to 9. Preference is given to neutralization with ammonia or with alkali metal hydroxides, especially sodium hydroxide. In the case of neutralization with sodium hydroxide it has been found advantageous if the pH following neutralization lies within the range from 7.0 to 7.9.

In a preferred embodiment of the present invention the aqueous film-forming formulation 1 comprises, in addition to the film-forming constituent and the customary auxiliaries, at least one finely divided filler and/or an inorganic pigment. The content of copolymer P or polymer P', respectively, in the formulation 1, based on its overall weight, is in the range from 10 to 60% by weight, preferably in the range from 20 to 40% by weight. The content of auxiliaries is generally in the range of from 0.1 to 30% by weight and preferably in the range from 0.5 to 10% by weight, and the content of fillers and/or pigments is in the range from 10 to 60% by weight and, in particular, from 15 to 50% by weight. The amount of pigment and/or fillers is generally between 50 and 450 parts by weight, based on 100 parts by weight of copolymer P or polymer P' in the aqueous formulation 1. In addition, pigmented formulations will preferably include a dispersant or wetting agent in addition to the film-forming auxiliaries and defoamers.

In this preferred embodiment, the pigment content of the aqueous formulation 2 can be the same as the pigment content of the aqueous formulation 1. Preferably, however, it is much lower; in other words, the difference in pigment concentration is at least 10% by weight. In particular the pigment concentration of the second formulation is ≦20% by weight based on the overall weight of the formulation 2. The formulation 2 may also be used in a form in which it is free from pigments. Particularly lustrous coatings are obtained by this means.

In this embodiment the formulation 1 will normally be applied in an amount of from 70 to 300 g/m$^2$ (calculated in wet form) and the formulation 2 in an amount of from 30 to 150 g/m$^2$ to the mineral molding. The proportion by weight between the amount of formulation 1 applied and that of formulation 2 is normally within the range from 4:1 to 1:1.5 and, in particular, in the range from 3:1 to 1.2:1.

The method of the invention can be applied in principle to all moldings which comprise a mineral binder. It develops its preferential effects when applied to mineral moldings comprising cement as their binder (precast concrete products and fiber cement slabs). For the purposes of the invention precast concrete products are shaped structures made of concrete and/or gas concrete, such as slabs, pipes and/or roof tiles. The precast concrete product is produced conventionally from ready-mixed concrete by an extrusion process. The aqueous formulations of the invention have the advantage here that they can be applied not only to the precast concrete product which has already set but also to the freshly produced and not yet fully set "green" product.

Drying of the green precast concrete products coated in accordance with the invention can be carried out conventionally, either at room temperature or elevated temperature. The coated green precast concrete product is preferably introduced into what is known as a chamber, where it is set in a process lasting from about 6 to 24 hours at from 40 to 70° C. and during which the copolymer of the coating composition forms a film. Following this process, the product is preferably sprayed a second time with the aqueous formulation of the invention. Further drying takes place in a tunnel furnace at temperatures of the circulating air of around 100° C.

Mineral moldings which have already set can also be coated at customary ambient temperatures, such as room temperature, with the formulations of the invention.

The advantageous properties of the aqueous formulations of the invention also apply in the case of mineral moldings that have been coated with a cement slurry. Such a slurry generally encompasses customary pigments, a cement as mineral binder, customary auxiliaries and water in an appropriate amount, and is applied to the mineral molding, preferably a precast concrete product, which has not yet finally set. The cement slurry coat has a thickness after setting in the range from 200 to 2000 µm. The aqueous formulations of the invention can be applied in the same way as described above.

The advantageous properties of the aqueous formulations of the invention are also evident to similar advantage in the case of fiber cement slabs (fiber-reinforced concrete slabs): that is, flat mineral moldings which comprise cement as binder and also mineral or organic fibers, such as polyester fibers and/or polyamide fibers, as aggregates. Application of the aqueous formulations of the invention generally takes place as described for green precast products.

The mineral moldings coated in accordance with the invention are notable firstly for the fact that their coating has a much higher long-term stability on outdoor weathering. In particular, the luster of the coating shows virtually no decline even after many years of weathering. The adhesion of the coating to the mineral moldings is high both in the fresh state and after weathering. The coated moldings are, moreover, effectively protected against efflorescence. This property is particularly significant for concrete roof tiles, which therefore constitute a preferred embodiment of the invention. In addition to this, the coatings are resistant to blocking.

Use of the aqueous formulations of the invention leads accordingly to enhanced preservation of the surface of mineral moldings. The mineral moldings thus coated are novel and are likewise provided by the present invention.

The examples indicated below are intended to illustrate the present invention.

EXAMPLES

I. Preparing the film-forming copolymers P and polymers P' in the form of aqueous dispersions (dispersions ID1, CD1 and D2)

1. Preparation procedure ID1 (in accordance with the invention)

A polymerization vessel was charged with 654.3 g of deionized water and 86.7 g of emulsifier solution 1 and this initial charge was heated to 55° C.

In a feed vessel 1 an emulsion was prepared from:

668.8 g of deionized water 23.1 g of emulsifier solution 2

1262.0g of n-butyl methacrylate 19.5 g of acrylic acid 23.4 g of 50% strength by weight aqueous acrylamide solution 6.5 g of 3-methacryloyloxypropyltrimethoxysilane.

In a second feed vessel 2 a solution was prepared from 2.6 g of Rongalit® C in 84.4 g of water. In a third feed vessel a solution was prepared from 2.6 g of tert-butyl hydroperoxide in 91.4 g of water. Then, still at 55° C., 200 g of feedstream 1 and 9 g of each of feedstreams 2 and 3 were added in succession in one portion to the initial charge, and the mixture was left to react for 12 minutes. This was followed by the addition to the polymerization vessel, beginning concurrently and by way of spatially separate feed ports, of the remaining amounts of feedstream 1, added over the course of 3 h, and of feedstreams 2 and 3 added over the course of 3.5 h, still at 55° C. Following the end of feedstream 2, postpolymerization was allowed to take place for 1 h and then the batch was cooled to 25° C. and neutralized with ammonia (pH≈9).

The solids content of the resulting dispersion was 45% by weight. The glass transition temperature determined by DSC was 44° C.

Emulsifier solution 1: 15% strength by weight aqueous solution of the sodium salt of a $C_{12}$-alkyl sulfate Emulsifier solution 2: 45% strength by weight aqueous solution of an active substance commercially available as Dowfax® 2A1 (Dow Chemical) (mixture of the mono-and bisdodecyl compound of the formula I as sodium salt).

2. Preparation procedure for CD1 (not in accordance with the invention)

A polymerization vessel was charged with 627.6 g of deionized water and 69.4 g of emulsifier solution 3 and this initial charge was heated to 82° C.

In a feed vessel 1 an emulsion was prepared from 605.4 g of deionized water 17.3 g of emulsifier solution 3

1211.7 g of n-butyl methacrylate 18.2 g of methacrylic acid 18.3 g of butanediol diacrylate 60.8 g of 20% strength by weight aqueous diacetoneacrylamide solution 121.2 g of 20% strength by weight aqueous acrylamide solution.

In a second feed vessel 2 a solution was prepared from 1.7 g of sodium peroxodisulfate in 68.9 g of water.

Subsequently, still at 85° C., 100 g of feedstream 1 and 16.3 g of feedstream 2 were added in succession in one portion to the initial charge. This was followed by the addition to the polymerization vessel, beginning concurrently and by way of spatially separate feed ports, of the remaining amounts of feedstream 1, added over the course of 2.5 h, and of feedstream 2, added over the course of 2.6 h, still at 85° C. Following the end of feedstream 2 postpolymerization was allowed to take place for 1 h and then the batch was cooled to 60° C. and neutralized with ammonia (pH≈7.5) and 148 g of 12% strength by weight aqueous adipic dihydrazide solution were added, stirring was continued at 60° C. for 30 minutes and the batch was then cooled to room temperature.

The solids content of the resulting dispersions was about 45% by weight.

Emulsifier solution 3: 28% strength by weight aqueous solution of the sodium salt of a fatty alcohol ether sulfate ($C_{12}$–$C_{14}$-alkyl, 2.5 ethylene oxide units).

3. Preparation procedure D1 (Polymer P')

A polymerization vessel was charged with 400 g of deionized water and 6.22 g of emulsifier solution 1 and this initial charge was heated at 85° C.

In a feed vessel 1 an emulsion was prepared from 200.0 g of deionized water 37.3 g of emulsifier solution 1

9.3 g of emulsifier solution 2

413.0 g of methyl methacrylate 287.0 g of n-butyl acrylate 14.0 g of acrylic acid and 7.0 g of 50% strength by weight aqueous acrylamide solution.

In a second feed vessel 2 a solution was prepared from 1.4 g of sodium peroxodisulfate in 75 g of water.

Subsequently, still at 85° C., 49 g of feedstream 1 and 7.6 g of feedstream 2 were added in succession in one portion to the intitial charge and reaction was allowed to take place for 30 minutes.

This was followed by the addition to the polymerization vessel, beginning concurrently and by way of spatially separate feed ports, of the remaining amounts of feedstream 1, added over the course of 3 h, and of feedstream 2, added over the course of 3.5 h, still at 85° C. Following the end of feedstream 2 postpolymerization was allowed to take place for 1 h and then the batch was cooled to 25° C. and neutralized with sodium hydroxide solution (pH≈8).

The solids content of the resulting dispersions was about 49% by weight. Glass transition temperature (DSC) 44° C.

Emulsifier solution 2: 45% strength by weight aqueous solution of an active substance commercially available as Dowfax® 2A1 (Dow Chemical) (mixture of the mono- and di-$C_1$–$C_{12}$-alkyl compound of the formula I as sodium salt).

Emulsifier solution 1: 15% strength by weight aqueous solution of the sodium salt of a $C_{12}$-alkyl sulfate 4. Preparation procedure D2 (Polymer P')

D2 was prepared as for D1 except that the methyl methacrylate was replaced fully by styrene. Solids content 49% by weight; glass transition temperature 42° C. (DSC).

II. Producing a coated mineral molding 0.5 g of a defoamer (Tego Foamex® 825 from Th. Goldschmidt AG) and 5 g of a technical-grade mixture of the di-n-butyl esters of succinic, glutaric and adipic acid were added to 100 g of each of dispersions ID1, CD1, D1 and D2.

The dispersions thus formulated were used in turn to formulate emulsion paints. For this purpose 253 g of a customary commercial filler (calcium carbonate/calcium silicate) and 38.8 g of red iron oxide pigment from BAYER AG were suspended in 112 g of water. 598 g of the formulated dispersions D1 were added with stirring. This gave a paint P1 having a p.v.c. (pigment volume concentration) of 27.

Similarly, the formulated dispersion D2 was used to prepare a paint P2 having a p.v.c. of 40 (372 g of filler, 57 g of red iron oxide pigment, 164 g of water and 408 g of dispersion D2).

Similarly, the formulated dispersion ID1 was used to produce a paint IP1 and the formulated dispersion CD1 a paint CP2, in each case with a p.v.c. of 10 (104 g of filler, 16 g of pigment, 46 g of water and 835 g of dispersion).

Prior to their performance testing, the resulting paints P1, P2, IP1 and CP1 were allowed to age at room temperature for 48 h. The paint was then applied by spraygun to a green precast concrete product*) (add-on about 320 g/m², based on the paint applied; so-called wet application). The slab was subsequently dried for 2 h at 40° C. and 75% relative atmospheric humidity and then for 4 h at 40° C. and 95% relative atmospheric humidity. It was then coated in the same way with the formulated dispersions ID1 or CD1 respectively or with the paints IP1 or CP1 respectively (about 160 g/m², based on the paint) and was dried for 8 h at 40° C. and 50% relative atmospheric humidity (so-called dry application).

*) The green precast concrete product used was a domed slab having a ground coverage of 30×20 cm and a thickness of 1.8 cm and produced by extruding a mortar of sand (grain size up to 0.3 mm) and cement (sand:cement ratio 4:1 by weight) together with water (water:cement ratio 1:2.5 by weight). The apex of the dome was about 4 cm above the base.

II.Testing the performance properties

1) Determining the protection of mineral moldings against efflorescence

For this purpose, a slab produced in accordance with II was placed for 7 d face down on a 60° C. water bath. The degree of efflorescence was assessed visually on the basis of the following scale of ratings. The results are compiled in Table 1.

0=no efflorescence

1=almost no efflorescence

2=slight efflorescence

3=moderate efflorescence

4=severe efflorescence

5=very severe efflorescence

2) Determining the luster of a precast concrete product under simulated wet-weather conditions.

A precast concrete product produced in accordance with II was treated for 7 d with water vapor as described under III 1). The luster of the coating was then assessed visually in the regions that had been exposed to the water vapor. The results are compiled in Table 1, based on the following scale of ratings:

0=very high luster
1=high luster
2=moderate luster
3=low luster
4=weakly lustrous to matt
5=matt, dull 3) Determining the luster of a precast concrete product under outdoor weathering conditions.

A precast concrete product produced in accordance with II was placed on an outdoor weathering stand at Ludwigshafen a. Rh., Rhineland-Palatinate, inclined at 45° with the coated side facing south. After three years the luster of the coating was assessed visually. The results are compiled i n Table 1, based on the following scale of ratings:

0=very high luster
1=high luster
2=moderate luster
3=low luster
4=weakly lustrous to matt
5=matt, dull 4) Determining the adhesion of the coating under simulated wet-weather conditions.

A precast concrete product produced in accordance with II was treated for 7 d with water vapor as described under III 1). The adhesion of the coating was then assessed in the regions that had been exposed to the water vapor. To this end a strip of adhesive tape (TESA™ from Beiersdorf AG) measuring 10 cm long by 3 cm wide was applied to the coating under gentle pressure with a rubber roller. After about 2 minutes the adhesive strip was removed sharply. The amount of the constituents adhering to the adhesive tape was assessed visually. The results are compiled in Table 1, based on the following scale of ratings:

0=none present
1=slightly evident
2=evident
3=conspicuous
4=highly conspicuous
5=very highly conspicuous

We claim:

1. A method of coating a mineral molding, comprising:

applying to said mineral molding at least one aqueous film-forming formulation comprising at least one copolymer P as film-forming constituent which is present in disperse form in the formulation and comprises an ethylenically unsaturated monomer, the monomer comprising
  i. from 70 to 99.9% by weight of at least one ester of methacrylic acid with a $C_2$–$C_{10}$,-alkanol and
  ii. from 0.1 to 30% by weight of at least one different monoethylenically unsaturated monomer other than methylmethacrylate; and not more than 1% by weight of a monomer having two or more ethylenically unsaturated double bonds.

2. The method as claimed in claim 1, wherein the ester of methacrylic acid is an ester with a n-alkanol having 2 to 6 carbon atoms.

3. The method as claimed in claim 1, wherein the monomer other than the ester of methacrylic acid comprises from 0.1 to 10% by weight, based on the overall weight of the monomers, of at least one monoethylencially unsaturated monomer having a water solubility $\geq 60$ g/l at a temperature of 25° C. and a pressure of 1 bar.

4. The method as claimed in claim 1, wherein the monomer other than the ester of methacrylic acid comprises from 0.05 to 2.0% by weight, based on the overall weight of the monomers, of at least one monoethylenically unsaturated, silicon-containing monomer.

5. The method as claimed in claim 1, where the copolymer P has a glass transition temperature TG in the range from −10 to +50° C.

6. The method as claimed in claim 1, wherein the film-forming aqueous formulation comprises, based on its overall weight,
  i. from 10 to 60% by weight of at least one copolymer P; and
  ii. from 0.1 to 20% by weight of an auxiliary.

7. The method as claimed in claim 1, wherein an untreated mineral molding is provided with at least one first coating by applying to said mineral molding at least one first aqueous film-forming formulation which comprises at least one copolymer P or a polymer P' which is different from copolymer P, comprises an ethylenically unsaturated monomer and has a glass transition temperature in the range from −20 to +80° C.; and

TABLE 1

| Example | First coating Pain p.v.c.[2] | | Second coating Formulation p.v.c.[2] | | Efflorescence | Luster wet-weather conditions | Luster Outdoor weathering | Adhesion |
|---|---|---|---|---|---|---|---|---|
| C1[1] | P2 | 44 | CP1 | 10 | 2 | 3 | 5 | 2 |
| C2 | P2 | 44 | CD1 | 0 | 2 | 1 | 5 | 2 |
| 1 | P2 | 44 | IP1 | 10 | 2 | 3 | 3 | 2 |
| 2 | P2 | 44 | ID1 | 0 | 2 | 1 | 3 | 2 |
| C3 | P1 | 27 | CP1 | 10 | 2 | 3 | 5 | 2 |
| C4 | P1 | 27 | CD1 | 0 | 2 | 1 | 5 | 2 |
| 3 | P1 | 27 | IP1 | 10 | 2 | 3 | 3 | 2 |
| 4 | P1 | P27 | ID1 | 0 | 2 | 1 | 3 | 2 |

[1]C = Comparative example
[2]p.v.c. = pigment volume concentration = (volume of pigment + filler)/(volume of pigment + filler + binder) × 100 then drying this coating;

repeating this procedure if desired and then applying at least one further aqueous film-forming formulation as defined in claim 1 to the mineral molding that has been provided with the first coat.

8. The method as claimed in claim 7, herein the first aqueous film-forming formulation comprises, based on its overall weight, i. from 10 to 60% by weight of at least one polymer P',
ii. from 0.1 to 20% by weight of an auxiliary and
iii. from 10 to 60% by weight of at least one filler and/or an inorganic pigment.

9. A mineral molding obtained by the method as defined in claim 1.

* * * * *